United States Patent [19]

Oda et al.

[11] 4,273,587

[45] Jun. 16, 1981

[54] POLYCRYSTALLINE TRANSPARENT SPINEL SINTERED BODY AND A METHOD FOR PRODUCING THE SAME

[75] Inventors: Isao Oda, Nagoya; Masayuki Kaneno, Tokoname; Issei Hayakawa, Tsushima, all of Japan

[73] Assignee: NGK Insulators, Ltd., Nagoya, Japan

[21] Appl. No.: 64,841

[22] Filed: Aug. 8, 1979

[30] Foreign Application Priority Data

Aug. 14, 1978 [JP] Japan ................................. 53-98947

[51] Int. Cl.$^3$ .......................................... C04B 35/44
[52] U.S. Cl. ..................... 106/73.4; 264/65; 264/66; 425/600
[58] Field of Search ................. 106/62, 73.4; 423/600; 264/65, 66

[56] References Cited

U.S. PATENT DOCUMENTS

| 3,026,210 | 3/1962 | Coble | 106/73.4 |
| 3,768,990 | 10/1973 | Sellers et al. | 106/62 |
| 3,950,504 | 4/1976 | Belding et al. | 106/62 |

Primary Examiner—O. R. Vertiz
Assistant Examiner—Mark Bell
Attorney, Agent, or Firm—Stevens, Davis, Miller & Mosher

[57] ABSTRACT

Polycrystalline spinel sintered body consisting mainly of $Al_2O_3$ and $MgO$ in a molar ratio of $Al_2O_3/MgO$ of ranging from 0.52/0.48 to 0.70/0.30 and containing 0.001–0.1% by weight of LiF has a high in-line transmission. The sintered body can be obtained by calcining a powdery mixture of $Al_2O_3$ and $MgO$ in a specifically limited molar ratio, molding the calcined mixture into a shaped article together with a specifically limited amount of LiF, and firing the shaped article under a specifically limited temperature condition.

3 Claims, No Drawings

POLYCRYSTALLINE TRANSPARENT SPINEL SINTERED BODY AND A METHOD FOR PRODUCING THE SAME

BACKGROUND OF THE INVENTION (1) Field of the Invention

The present invention relates to a polycrystalline transparent spinel sintered body and a method of producing the same.

(2) Description of the Prior Art

A transparent spinel sintered body consisting mainly of aluminum oxide and magnesium oxide has a cubic system crystal structure, and is free from double refraction. Therefore, the transparent spinel sintered body has an excellent light transmission in visible spectrum and infrared ray.

As the method of producing polycrystalline transparent spinel sintered body, the following methods have hitherto been known.

(1) A stoichiometric mixture of $Al_2O_3$ and MgO is hot pressed.

(2) A stoichiometric powdery mixture of $Al_2O_3$ and MgO is fired together with calcium oxide (CaO) or magnesium oxide (MgO).

(3) A powdery mixture of $Al_2O_3$ and a stoichiometrically excess amount of MgO for spinel is fired together with more than 0.2% by weight of LiF.

(4) Alumina single crystal (sapphire) or polycrystalline high-density alumina sintered body is contacted with MgO vapor to form a spinel.

However, these methods have the following drawbacks. That is, in the method of hot pressing a stoichiometric mixture of $Al_2O_3$ and MgO of the above item (1), a die made of carbon is used, and therefore the resulting sintered body is always a dark sintered body having a simple shape, and moreover the sintered body is expensive due to its low productivity. In the method of firing a stoichiometric powdery mixture of $Al_2O_3$ and MgO together with CaO or MgO of the above item (2), and in the method of firing a powdery mixture of $Al_2O_3$ and a stoichiometrically excess amount of MgO for spinel together with more than 0.2% by weight of LiF of the above item (3), a relatively large amount of additive must be used, and therefore the resulting sintered body is poor in the purity and is poor in the light transmittance. In the method of contacting alumina single crystal or polycrystalline alumina sintered body with MgO vapor of the above item (4), it is very difficult to control the amount of MgO vapor, and hence the production of a homogeneous sintered body is difficult.

SUMMARY OF THE INVENTION

The inventors have made various investigations in order to obviate the above described drawbacks of the conventional methods, and succeeded in the removal of the optical defects for lowering the light transmittance of a conventional polycrystalline spinel sintered body by the synergistic effect due to the combination of a specifically limited composition consisting of MgO and a stoichiometrically excess amount of $Al_2O_3$ for spinel, a specifically limited amount of sintering aid and a specifically limited firing condition, whereby the inventors have succeeded in the production of a polycrystalline transparent spinel sintered body having an excellent light transmittance.

That is, one of the features of the present invention is the provision of a polycrystalline transparent spinel sintered body consisting mainly of $Al_2O_3$ and MgO in a molar ratio of $Al_2O_3$/MgO of ranging from 0.52/0.48 to 0.70/0.30 and containing 0.001–0.1% by weight of LiF.

Another object of the present invention is the provision of a method of producing a polycrystalline transparent spinel sintered body, comprising mixing $Al_2O_3$ with MgO or an aluminum compound with a magnesium compound, which are formed into $Al_2O_3$ and MgO by calcination respectively, in a molar ratio of $Al_2O_3$/MgO of ranging from 0.50/0.50 to 0.525/0.475, calcining the mixture at 1,150°–1,300° C., mixing the calcined mixture with 0.01–0.2% by weight of LiF based on the amount of the calcined mixture, molding the resulting mixture into a given shape, subjecting the shaped article to a primary firing at 1,200°–1,400° C. and then to a secondary firing at 1,700°–1,900° C. under an atmosphere of hydrogen atmosphere, vacuum or an inert gas atmosphere, wherein a temperature-raising rate is not higher than 100° C./hr within the temperature range between the primary firing step and the secondary firing step.

Particularly, the present invention is based on the discovery that, when a raw material powder containing alumina in an amount of slightly larger than the stoichiometrical amount for spinel and further containing a specifically limited amount of LiF is fired under a specifically limited condition, the raw material powder can be formed into a sintered body having a density higher than that of conventional sintered body at a temperature lower than the firing temperature in the conventional method and a spinel sintered body having an excellent light transmittance can be obtained.

DESCRIPTION OF THE PREFERRED EMBODIMENTS

The method of producing a polycrystalline transparent spinel sintered body according to the present invention will be explained in detail hereinafter.

$Al_2O_3$ and MgO or an aluminum compound and a magnesium compound, which are formed into $Al_2O_3$ and MgO by calcination respectively, are mixed in a molar ratio of $Al_2O_3$/MgO of ranging from 0.50/0.50 to 0.525/0.475 in order to obtain a spinel sintered body having a given mixing ratio of $Al_2O_3$/MgO. The resulting mixture is thoroughly mixed in a ball mill, and then calcined at 1,150°–1,300° C. in air for preferably at least one hour. The calcined mixture, after preferably finely divided, is mixed with 0.01–0.2% by weight of LiF based on the amount of the calcined mixture to produce a raw material mixture. In order to mix homogeneously the calcined mixture with LiF, it is preferable that the calcined mixture and LiF are mixed in a ball mill together with distilled water. The resulting raw material mixture is fully dried as such, and further fully dried together with a temporary bonding agent, such as polyvinyl alcohol or the like, as a molding aid. After the dried mixture is preferably made into uniform size by passing the mixture through a 60-mesh sieve (JIS standard), the mixture is molded into a given shape. The molded article is fired under an atmosphere of hydrogen atmosphere, vacuum or an inert gas atmosphere. The firing of the molded article is carried by a two-staged firing. The primary firing of the molded article is carried out by keeping the article at a constant temperature within the temperature range of 1,200°–1,400° C. or by heating gradually the article at a temperature-raising rate of about 50° C./hr within the temperature range of 1,200°–1,400° C., and the secondary firing of the primarily fired article is carried out by keeping the article at a constant temperature within the temperature range of 1,700°–1,900° C. or by heating gradually the article at a temperature-raising rate of not higher than 50° C./hr within the temperature range of 1,700°–1,900° C., wherein a temperature-raising rate is not higher than 100° C./hr within the temperature range between the primary firing step and the secondary firing step whereby a polycrystalline transparent spinel sintered body aimed in the present invention is produced. It is particularly important at the firing that the primary fired article is fired gradually at a low temperature-raising rate of not higher than 100° C./hr within the temperature range between the primary firing step and the secondary firing step.

As the $Al_2O_3$ raw material and MgO raw material, either powdery $Al_2O_3$, powdery MgO or an aluminum compound, a magnesium compound, which form $Al_2O_3$ and MgO by a thermal decomposition respectively, can be used. However, the use of aluminum compound and magnesium compound is preferable, because a uniform mixture of finely divided $Al_2O_3$ powder and MgO powder is formed. The transparent spinel sintered body of the present invention contains $Al_2O_3$ in a molar ratio higher than the molar ratio in the starting $Al_2O_3$ and MgO powdery mixture for spinel due to the vaporization of MgO from the sintered body during the firing. The ratio of $Al_2O_3$ to MgO in the resulting sintered body varies depending upon the composition of the starting $Al_2O_3$ and MgO powdery mixture for spinel, firing temperature and firing time and the like. However, it is necessary that a spinel sintered body having a good transmissivity has a molar ratio of $Al_2O_3$/MgO within the range of 0.52/0.48–0.70/0.30. When the molar ratio of $Al_2O_3$/MgO is higher than 70/30, a second phase consisting mainly of $Al_2O_3$ is apt to be precipitated in the grain boundary, while when the molar ratio of $Al_2O_3$/MgO is lower than 0.52/0.48, pores cannot be completely removed due to exaggerated grain growth. Therefore, a spinel sintered body having a molar ratio of $Al_2O_3$/MgO higher than 0.70/0.30 or lower than 0.52/0.48 has a very poor light transmittance.

The reason why the amount of LiF contained in the sintered body is limited to 0.001–0.1% by weight is as follows. When the amount is more than 0.1% by weight, the second phase is precipitated in the grain boundary of spinel, while when the amount is less than 0.001% by weight, pores cannot completely removed, and the sintered body containing more than 0.1% by weight or less than 0.001% by weight of LiF is poor in the light transmittance.

Further, the reason why the molar ratio of $Al_2O_3$ to MgO in the starting $Al_2O_3$ and MgO powdery mixture for spinel is limited within the range of from 0.50/0.50 to 0.525/0.475 is as follows. When the molar ratio of $Al_2O_3$/MgO exceeds 0.525/0.475, a second phase consisting mainly of the excess $Al_2O_3$ is apt to be precipitated in the grain boundary, and the light transmittance of the resulting sintered body decreases.

The starting $Al_2O_3$ and MgO powdery mixture for spinel is calcined at 1,150°–1,300° C. The reason is as follows. When the calcination temperature is lower than 1,150° C., $Al_2O_3$ does not sufficiently react with MgO, and powders of spinels having ununiform ratios of $Al_2O_3$/MgO are apt to be formed. While, when the calcination temperature is higher than 1,300° C., grains grow extraordinarily and uniform grain growth in the following firing step is disturbed.

The reason why the calcined mixture of $Al_2O_3$ and MgO is mixed with 0.01–0.2% by weight of LiF based on the amount of the mixture is as follows. When the amount of LiF is larger than 0.2%, more than 0.1% by weight of LiF remains in the resulting sintered body, and the second layer is precipitated to decrease the light transmittance of the sintered body. While, when the amount of LiF is smaller than 0.01% by weight, the amount of Lif remaining in the sintered body decreases to less than 0.001% by weight, and the effect of LiF does not appear and a transparent spinel sintered body cannot be obtained.

The reason why the firing atmosphere is limited to an atmosphere of hydrogen atmosphere, vacuum or inert gas atmosphere is that a transparent spinel sintered body cannot be obtained when those atmospheres are not used.

The reason why the primary firing is carried out at a temperature of 1,200°–1,400° C. is that a primary firing temperature lower than 1,200° C. is too low to form a dense sintered body, while a primary firing temperature higher than 1,400° C. causes exaggerated grain growth in the following firing steps. The reason why the temperature-raising rate for the primarily fired article within the temperature range between the primary firing step and the secondary firing step is limited to not higher than 100° C./hr is that a temperature-raising rate of higher than 100° C./hr causes a rapid local grain growth, and pores are apt to be closed in the article, and hence the light transmittance of the resulting sintered body is lowered.

Further, the reason why the secondary firing temperature is limited to 1,700°–1,900° C. is that, when the firing temperature is lower than 1,700° C., a spinel sintered body having an excellent transmissivity cannot be obtained, while when the firing temperature is higher than 1,900° C., exaggerated grain growth occurs and cracks are formed in the grain boundary.

The following example is given for the purpose of illustration of this invention and is not intended as a limitation thereof.

Guaranteed reagents of ammonium alum and magnesium nitrate were mixed in amounts that the resulting mixture contains $Al_2O_3$ and MgO in a molar ratio shown in the following Table 1, and the resulting mixture was calcined in air at 1,200° C. for 3 hours. It was found from the X-ray diffractometry that the calcined powder has an X-ray diffraction pattern of spinel, and the powder had a grain size of not larger than 1 μm. The calcined powder was mixed with LiF in an amount shown in Table 1 based on the amount of the calcined powder, and the resulting mixture was mixed in wet state for 3 hours together with plastic balls. Then, the above treated mixture was heated at 500° C. for 1 hour in air to remove the plastic residue, mixed with 2% by weight of PVA and dried. Then, the mixture was passed through a 60-mesh sieve (JIS standard) to be made into uniform grain size. The powders were preliminarily molded in a mold and then subjected to an isostatic press under a pressure of 2,500 kg/cm². The resulting shaped article was heated at 700° C. for 3 hours in air to remove the binder. Then, under an atmosphere shown in Table 1, the above treated shaped article was subjected to a primary firing at 1,300° C. for 3 hours and further to a secondary firing under a temperature and time condition shown in Table 1. Between the primary and secondary firing steps, the primarily fired article was heated from 1,300° C. to 1,700° C. at a temperature-raising rate shown in Table 1.

For comparison, sintered bodies were produced under the same condition as described above, except that the molar ratio of $Al_2O_3/MgO$ in the starting $Al_2O_3$ and MgO powdery mixture for spinel, the addition amount of LiF to the calcined mixture of $Al_2O_3$ and MgO or the temperature-raising rate between the primary and secondary firing steps were outside the range defined in the present invention.

The spinel sintered bodies of the present invention were compared with the comparative spinel sintered bodies with respect to the molar ratio of $Al_2O_3$ to MgO, the LiF content and the in-line transmission in a thickness of 1.5 mm and at a wave length of 0.6 μm. The obtained results are shown in Table 1.

As described above, the polycrystalline transparent spinel sintered body have a very excellent light transmission due to the synergistic effect of the combination of the specifically limited mixing ratio of $Al_2O_3$ to MgO, the amount of $Al_2O_3$ being larger than the stoichiometrical amount of $Al_2O_3$ for spinel, the specifically limited addition amount of LiF and the temperature-raising rate of not higher than 100° C./hr within the specifically limited temperature range. The sintered body is particularly useful as a material for discharge lamp and other optical materials, such as a window for transmitting infrared ray, a window for watch and the like, and is very useful for industry.

What is claimed is:

1. A polycrystalline transparent spinel sintered body consisting mainly of $Al_2O_3$ and MgO in a molar ratio of $Al_2O_3/MgO$ of ranging from 0.52/0.48 to 0.70/0.30, TABLE 1(a)

| | Sample No. | Composition of starting $Al_2O_3$ and MgO powdery mixture for spinel (molar ratio) $Al_2O_3$:MgO | Addition amount of LiF (% by weight) | Atmosphere | Maximum firing temperature and time | | Temperature-raising rate between 1,300–1,700° C. (°C./hr) | Composition of sintered body (molar ratio) $Al_2O_3$:MgO | LiF content (% by weight) | In-line transmission (%) |
|---|---|---|---|---|---|---|---|---|---|---|
| | | | | | Temperature (°C.) | Time (hr) | | | | |
| | 1 | 0.501:0.499 | 0.05 | $H_2$ | 1,700 | 5 | 20 | 0.557:0.443 | 0.024 | 64.5 |
| | 2 | 0.501:0.499 | 0.05 | vacuum | 1,800 | 5 | 50 | 0.603:0.397 | 0.010 | 67.1 |
| | 3 | 0.501:0.499 | 0.10 | vacuum | 1,800 | 5 | 50 | 0.596:0.404 | 0.022 | 67.5 |
| | 4 | 0.501:0.499 | 0.20 | $H_2$ | 1,700 | 1 | 50 | 0.527:0.473 | 0.100 | 60.1 |
| | 5 | 0.501:0.499 | 0.20 | vacuum | 1,800 | 5 | 100 | 0.583:0.417 | 0.041 | 61.3 |
| | 6 | 0.505:0.495 | 0.01 | He | 1,700 | 10 | 20 | 0.573:0.427 | 0.004 | 62.8 |
| | 7 | 0.505:0.495 | 0.01 | $H_2$ | 1,850 | 10 | 20 | 0.646:0.354 | 0.001 | 69.0 |
| | 8 | 0.505:0.495 | 0.01 | He | 1,800 | 3 | 50 | 0.575:0.425 | 0.004 | 64.0 |
| Sintered | 9 | 0.505:0.495 | 0.10 | He | 1,800 | 3 | 100 | 0.570:0.430 | 0.034 | 60.5 |
| body | 10 | 0.505:0.495 | 0.10 | $H_2$ | 1,800 | 3 | 50 | 0.576:0.424 | 0.031 | 68.8 |
| of the | 11 | 0.505:0.495 | 0.20 | $H_2$ | 1,850 | 10 | 100 | 0.641:0.359 | 0.030 | 64.5 |
| present | 12 | 0.512:0.488 | 0.05 | $H_2$ | 1,800 | 10 | 50 | 0.618:0.382 | 0.012 | 72.3 |
| invention | 13 | 0.512:0.488 | 0.05 | Ar | 1,850 | 5 | 50 | 0.628:0.372 | 0.011 | 60.7 |
| | 14 | 0.512:0.488 | 0.15 | Ar | 1,750 | 10 | 50 | 0.597:0.403 | 0.053 | 62.5 |
| | 15 | 0.512:0.488 | 0.15 | vacuum | 1,750 | 10 | 100 | 0.607:0.393 | 0.038 | 61.0 |
| | 16 | 0.512:0.488 | 0.20 | vacuum | 1,700 | 5 | 20 | 0.573:0.427 | 0.081 | 64.8 |
| | 17 | 0.525:0.475 | 0.10 | $H_2$ | 1,700 | 5 | 20 | 0.579:0.421 | 0.048 | 65.1 |
| | 18 | 0.525:0.475 | 0.10 | $H_2$ | 1,850 | 15 | 50 | 0.697:0.303 | 0.010 | 60.5 |
| | 19 | 0.525:0.475 | 0.15 | vacuum | 1,800 | 10 | 50 | 0.637:0.363 | 0.021 | 63.8 |
| | 20 | 0.525:0.475 | 0.20 | He | 1,800 | 10 | 50 | 0.623:0.377 | 0.055 | 63.1 |
| | 21 | 0.525:0.475 | 0.20 | $H_2$ | 1,800 | 10 | 100 | 0.629:0.371 | 0.045 | 66.5 |

TABLE 1(b)

| | Sample No. | Composition of starting $Al_2O_3$ and MgO powdery mixture for spinel (molar ratio) $Al_2O_3$:MgO | Addition amount of LiF (% by weight) | Atmosphere | Maximum firing temperature and time | | Temperature-raising rate between 1,300–1,700° C. (°C./hr) | Composition of sintered body (molar ratio) $Al_2O_3$:MgO | LiF content (% by weight) | In-line transmission (%) |
|---|---|---|---|---|---|---|---|---|---|---|
| | | | | | Temperature (°C.) | Time (hr) | | | | |
| | 22 | 0.463:0.537 | 0.40 | $H_2$ | 1,650 | 5 | 50 | 0.486:0.514 | 0.220 | 41.3 |
| | 23 | 0.463:0.537 | 0.40 | Ar | 1,750 | 10 | 150 | 0.547:0.453 | 0.140 | 39.5 |
| | 24 | 0.463:0.537 | 0.10 | Ar | 1,750 | 10 | 150 | 0.551:0.449 | 0.035 | 41.6 |
| | 25 | 0.480:0.520 | 0.30 | vacuum | 1,600 | 15 | 50 | 0.501:0.499 | 0.140 | 47.2 |
| Compara- | 26 | 0.480:0.520 | 0.30 | CO | 1,800 | 5 | 50 | 0.565:0.435 | 0.098 | 38.1 |
| tive | 27 | 0.480:0.520 | 0.20 | CO | 1,800 | 5 | 100 | 0.559:0.441 | 0.065 | 35.7 |
| sintered | 28 | 0.533:0.467 | 0.10 | $H_2$ | 1,750 | 10 | 200 | 0.618:0.382 | 0.30 | 48.9 |
| body | 29 | 0.533:0.467 | 0.10 | $H_2$ | 1,850 | 5 | 200 | 0.652:0.348 | 0.021 | 45.6 |
| | 30 | 0.533:0.467 | 0.35 | $H_2$ | 1,850 | 5 | 100 | 0.659:0.341 | 0.063 | 44.3 |
| | 31 | 0.551:0.449 | 0.15 | vacuum | 1,600 | 10 | 50 | 0.579:0.421 | 0.071 | 42.1 |
| | 32 | 0.551:0.449 | 0.40 | $H_2$ | 1,800 | 10 | 50 | 0.655:0.345 | 0.100 | 44.7 |
| | 33 | 0.551:0.449 | 0.10 | $H_2$ | 1,800 | 10 | 150 | 0.650:0.350 | 0.026 | 42.3 |

It can be seen from Table 1 that all the spinel sintered bodies of the present invention have an in-line transmission of higher than 60% and is very excellent in the light transmission, but the comparative spinel sintered bodies produced under a condition outside the range defined in the present invention is very poor in the in-line transmission.

and containing 0.001–0.1% by weight of LiF.

2. A method of producing a polycrystalline transparent spinel sintered body, comprising mixing $Al_2O_3$ with MgO or an aluminum compound with a magnesium compound, which are formed into $Al_2O_3$ and MgO by calcination respectively, in a molar ratio of $Al_2O_3/MgO$ of ranging from 0.50/0.50 to 0.525/0.475, calcining the mixture at 1,150°–1,300° C., mixing the calcined mixture with 0.01–0.2% by weight of LiF based on the amount of the calcined mixture, molding the resulting mixture into a given shape, subjecting the shaped article to a primary firing at 1,200°–1,400° C. and then to a secondary firing at 1,700°–1,900° C. under an atmosphere of hydrogen atmosphere, vacuum or an inert gas atmosphere, wherein a temperature-raising rate is not higher than 100° C./hr within the temperature range between the primary firing step and the secondary firing step.

3. The polycrystalline transparent spinel sintered body produced by the method of claim 2.

* * * * *